Oct. 12, 1954

G. O. JONES 2,691,504

DIAPHRAGM TYPE PILOT AND MAIN VALVE

Filed July 26, 1950

INVENTOR.
George O. Jones
BY

Oct. 12, 1954  G. O. JONES  2,691,504
DIAPHRAGM TYPE PILOT AND MAIN VALVE
Filed July 26, 1950  2 Sheets-Sheet 2

INVENTOR.
George O. Jones
BY
HIS ATTORNEYS

Patented Oct. 12, 1954

2,691,504

UNITED STATES PATENT OFFICE 2,691,504

DIAPHRAGM TYPE PILOT AND MAIN VALVE

George O. Jones, Mansfield, Ohio

Application July 26, 1950, Serial No. 175,904

2 Claims. (Cl. 251—46)

My invention relates to valves for controlling the flow of fluids and relates more particularly to a valve which by virtue of the internal pressures therein of the liquids or gases flowing therethrough regulates the flow therefrom.

It is an object of my invention to provide a valve of the character described which will be composed of but few operating parts, will be inexpensive to manufacture and effective in operation.

It is another object of my invention to provide a valve of the character described which will be smooth in action and which will meet varying conditions of pressure without the necessity of external control or adjustment.

A further object of my invention is to dispense with the use of packing glands, etc.

Another object of my invention is to provide a valve of the character described in which the only external force necessary is the manual or external operation of opening or initiating the opening action of the valve and the valve structures operate in such manner as to ensure a smooth flow therefrom.

Another object of my invention is to provide a fluid control valve which is automatic in operation and which is adapted to compensate for variations in pressures within the valve chamber, the valve automatically adjusting to increase or decrease of fluid pressures, wherefore, the flow passing through the valve is a smooth flowing action of liquids or gases therefrom.

A further object of my invention is to provide in a valve of the character described, means preventing siphonage or back pressures created, for example, by a break in the line or a pressure drop.

Other objects of my invention and the invention itself will become more readily apparent from a perusal of the following description and the appended drawings, in which drawings.

Figure 1:
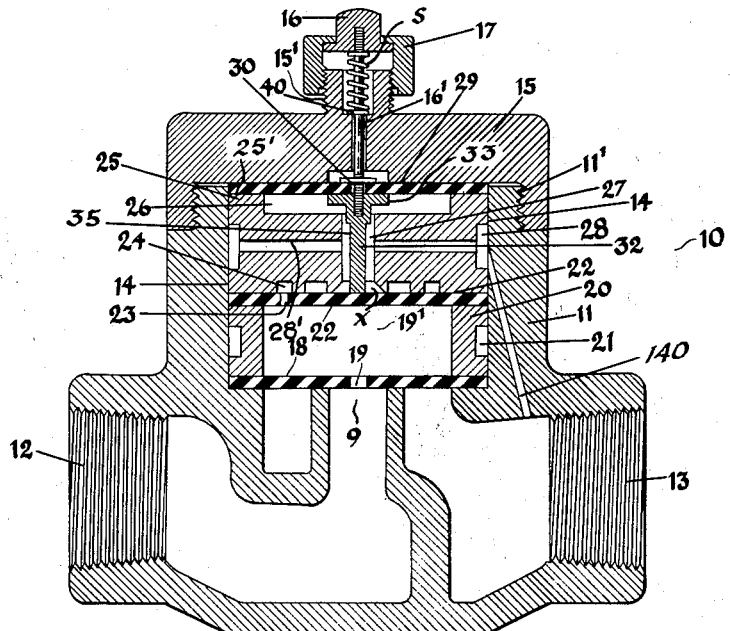
Fig. 1 is a vertical sectional view of the improved valve of my invention in closed position.
Figure 2:
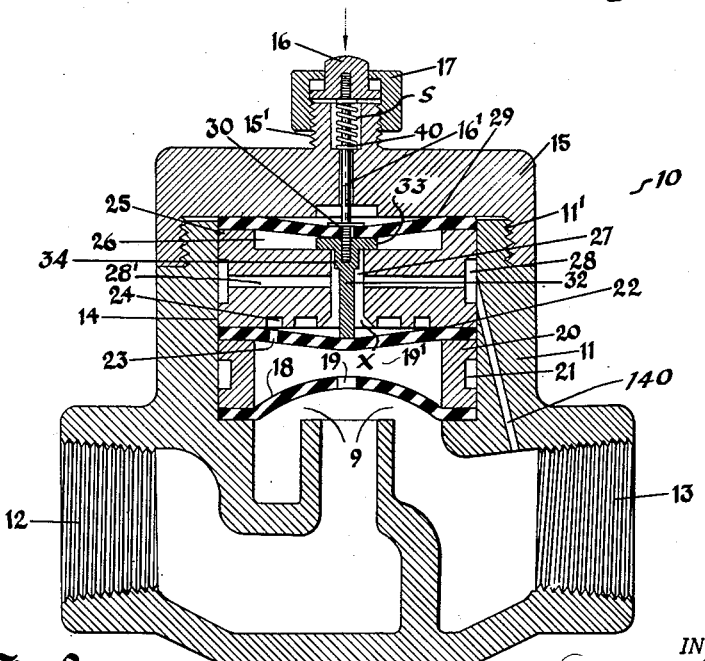
Fig. 2 is a vertical sectional view of the valve of Fig. 1 in open position.

Referring now to the first embodiment of my invention as illustrated in Figs. 1 and 2, the valve 10 includes a valve housing member 11 having a pair of longitudinally aligned screw-threaded passages 12 and 13, the passage 12 being an inlet passage and the passage 13 being an outlet passage, and an integrally formed vertically projecting valve barrel 14 forming a main pressure control chamber within the body of the casing 11, the inlet passage 12 porting into the outlet passage 13 through a port 9, as best shown in Fig. 2. The casing 11 is formed with a reduced head portion 11', said head being externally threaded. At 15 I show an internally and externally screw-threaded cap centrally apertured to receive the stem 16' of a finger tip push button control device 16 threadedly mounted on said stem 16'. An adjustment ring 17 is telescoped over said control device 16 and internally threaded to engage the threads of an upwardly extending boss 15' carried by the cap 15. A tension spring "s" is loosely telescoped over the stem 16' and seats upon a shoulder 40 provided by enlarging the lower portion of the stem and abuts the lower surface of the push button 16.

Interposed within the valve barrel 14 and overlying the upwardly projecting relatively narrow mouth of the inlet passage and port 9, I have placed an annular gasket-type diaphragm 18 of flexible material, such as rubber or the like, having an aperture 19 centrally disposed therein which communicates with the pressure chamber 19' formed within the barrel 14 by seating a spacer ring 20 having an exterior diameter slightly less than the inner diameter of the valve barrel 14, upon the diaphragm 18.

Superposed over the spacer ring 20 is a diaphragm 22 similar to the diaphragm 18, having an aperture 23 provided therein at one side thereof and relatively laterally of the aperture 19 of the first said diaphragm.

The aperture 23 in the diaphragm 22 is adapted to communicate with one of a series of circular ports or grooves 24 provided in the lowermost face of a cylindrical pressure release valve assembly unit 25 seated upon said diaphragm 22. The uppermost face of the valve unit 25 is provided with a centrally recessed portion 26 and said unit is centrally bored as shown at 27, said bore being enlarged and tapered at its lowermost portion as shown at $x$. The unit 25 is provided with an annular groove 28 centrally disposed and circumferentially extending about its outer face, and a relatively narrow bore 28' disposed transversely of the unit joins the groove 28 and the vertical bore 27. The groove 28 also opens into a diagonally disposed port 140 which communicates with the outlet passage 13. A diaphragm 29 is seated upon the upstanding circular rim portion 25' of the unit 25 formed by providing the recess portion 26 and is centrally apertured, as at 30, to permit the projection therethrough of the stem 16' secured, as heretofore described, to the push button device 16. The plunger 32 is provided with an enlarged centrally bored head portion 33, a stepped down shoulder portion 34 and a progressively more stepped stem portion 35, said portion 35 projecting within the bore 27 of the unit 25 and the head 33 of said plunger is secured to the downwardly projecting end of the stem 16' of the control device 16.

In the closed position of the valve of the first embodiment of my invention shown in Fig. 1, the line pressure in the inlet passage 12 forces its way through the opening 19 in the line check diaphragm 18 into the pressure chamber 19' forcing the diaphragm 18 to seat on the valve port 9 completing the closing action, the fluid above the diaphragm being confined within the chamber 19' and the pressure is static.

The static pressure above the diaphragm 18 may be relieved by means of external force or manual pressure exerted on the finger tip control button 16 or by tightening the control adjustment ring 17, this pressure being transferred by the stem connected plunger 32 to the pressure release diaphragm 22, depressing the same wherefore the diaphragm 22 is forced away from its seating on the lower face of the valve unit 25 and the pressure in the chamber 19' escapes through the opening 23 in the diaphragm, passing by the ports 24 in the pressure release valve assemly unit 25, through the bore 27 and the bore 28', into the groove 28 and through the port 140 into the outlet passage 13. Thus, the pressure in the inlet passage 12 below the diaphragm 18 overcomes the pressure above the diaphragm 18 and forces the diaphragm 18 away from the port 9 completing the opening action and allowing flow of the liquids or gases from the inlet passage 12 to the outlet passage 13, as illustrated in Fig. 2.

Figure 3:
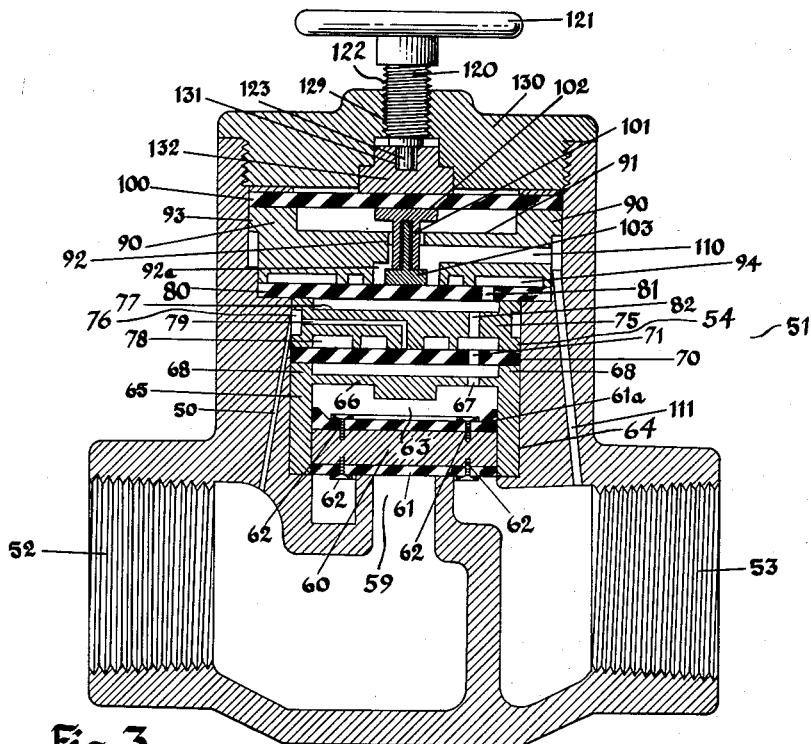
Fig. 3 is a vertical sectional view of a second embodiment of my invention, having an antisiphon principle involved therein, in closed position.
Figure 4:
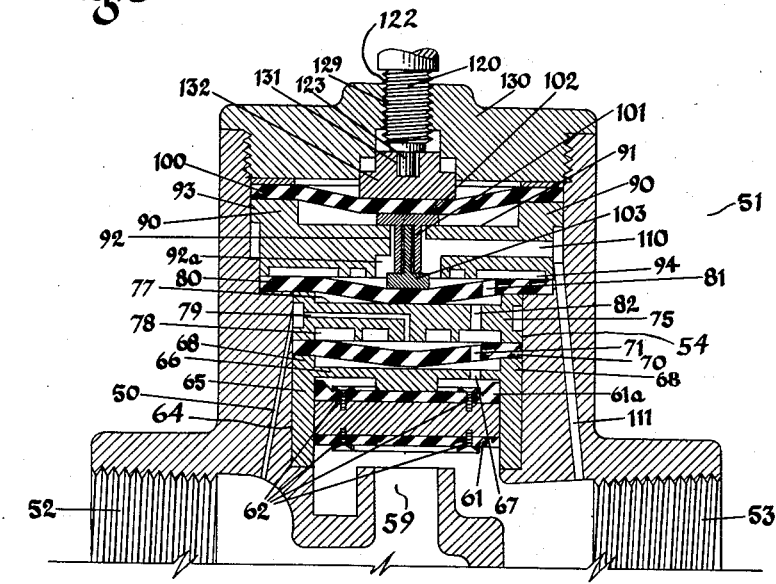
Fig. 4 is a vertical sectional view of the valve of Fig. 3 in open position.

In the form of my invention as shown in Figs. 3 and 4, an anti-siphon principle is added to the essential operating elements of the form of Figs. 1 and 2, a diagonally skewed port 50 being provided in the inlet side of the valve housing opening into the inlet passage 52, the function and operation thereof being hereinafter more fully described.

The valve assembly of this second embodiment of my invention includes a valve housing member 51 having an inlet passage 52 and an outlet passage 53, longitudinally aligned, and an integrally formed vertically upwardly projecting valve barrel 54 forming a main pressure control chamber within the body of the casing 51, the inlet passage porting into the outlet passage through a port 59, as best shown in Fig. 4. A piston 60 having a pair of rubber or like flexible gaskets 61, 61a secured on either face thereof by means of screws 62 or the like is adapted to seat upon and overlie the port 59, as shown in Fig. 3, in a manner similar to that of the diaphragm 18 in the first embodiment of my invention. A main pressure control chamber 63 is formed between the piston 60 and its associated gaskets and an integral cylindrical sleeve and spacer element 64, the sleeve portions 65 being telescoped within the barrel of the valve housing and over the piston 60 and having a disc portion 66 substantially the same diameter as the gaskets 61, 61a superposed a spaced distance above the piston 60 in the closed position of the valve. An aperture 67 is disposed at the right hand side of (as viewed in the drawings) and extends through the disc surface 66. The said sleeve, it will be noted, is provided with an upstanding shoulder portion 68 upon which a rubber or like flexible cylindrical diaphragm 70 is seated. An aperture 71 in the said diaphragm is aligned with the aperture 67 in the disc. A cylindrical anti-siphon valve assembly unit 75 is interposed between the diaphragm 70 and a second diaphragm 80 apertured at 81, and is preferably a relatively wide metal disc provided with an annular centrally disposed relatively wide groove 76 about its outer periphery, a recessed upper cylindrical face portion 77, a plurality of circlar grooves or guideways 78 in its lowermost face, and a bore 79 opening into the groove 76 and extending transversely thereof to a mid-portion of the unit, the bore then extending at right angles vertically through the center of the unit 75 providing an opening in the lower face of the said unit.

The outermost groove of the grooves 78 is adapted to communicate, as shown in Figs. 3 and 4, with a vertically extending laterally disposed bore 82 which is also adapted to be aligned with the apertures 67 and 71. A cylindrical pressure release valve assembly unit 90 is disposed between the diaphragm 80 and a third diaphragm 100. Said release unit is formed as a relatively wide metallic disc centrally depressed as shown at 91 and centrally bored as shown at 92, provided with an outwardly extending rim 93, upon which the diaphragm 100 is seated, and grooved guideways 94 in the lowermost face thereof. A transverse bore 110 extends at right angles to the center bore 92 of the unit 90 and communicates with a diagonally skewed outlet port 111 opening into the outlet passage 53 and being disposed in the outlet side of the housing 51. The outlet port 111 is preferably of greater diameter than the port 59 on the inlet side of the valve barrel, for a purpose later to be described herein.

Plunger means 101, I-shaped in cross section, is preferably reciprocably positioned within the bore 92, the enlarged head 102 thereof, whose outside diameter is greater than the diameter of the said bore 92, being positioned within the recessed portion 91 of the unit and the enlarged foot 103 thereof being disposed within the enlarged bore portion 92a of the unit 90, the foot contacting the center of the diaphragm 80. A handle operated screw threaded plunger 120 is provided with a rotatable handle 121, a screw threaded stem 122 engaging an internally threaded portion 129 of the valve head 130 and said plunger stem terminates in an unthreaded flat end portion 123 which projects into a central depressed portion 131 of diaphragm engaging flat pressure means 132.

To initiate the opening of the valve, the handle 121 is rotated in a clockwise direction wherefore the means 132 is pressed downwardly against the center of the diaphragm 100, depressing the same, and the I-shaped means 101, in turn presses down upon the center of the diaphragm 80 wherefore the center thereof is depressed. The static pressure normally confined within the chamber 63 and built up by virtue of liquids or gases entering the chamber through the port 50, the bore 79, by the groove 78 and through apertures 71 and 67 is now relieved by passage permitted through bores 82, 81, 92, 110 and outlet port 111, as shown in Fig. 4. The pressure on the underside of the piston 60 then overcomes the pressure on the upper side thereof, and the line fluid entering the passage 52 now flows through the port 59 into the outlet passage 53 and the valve is opened.

By providing the unit 75 in the valve of this embodiment, if the increase of the pressure on the outlet port should become greater than the line pressure on the inlet side, due to a breaking in the line etc., the valve will automatically utilize the increased back pressure to keep the valve closed and prevent pollution of the line. This is accomplished by virtue of the passage of liquids or gases, as the case might be, in the outlet port 111, through the bores 110, 92a, and the apertures 81, 82, and 71 and 67 wherefore sufficient pressure will be maintained in the pressure chamber 63 to hold the piston 60 and its associated gaskets 61, 61a in the position shown in Fig. 3, so that back flow is interrupted between the inlet and the outlet passages 52 and 53.

Although I have described my invention in connection with certain preferred embodiments thereof, I am aware that numerous and extensive departures may be made therefrom without, however, departing from the spirit of my invention as defined in the appended claims.

I claim:

1. In a valve, a valve housing member having a pair of longitudinally aligned inlet and outlet passages, and a vertically extended valve portion, a port connecting said passages, annular flexible means overlying said port and passages, an opening centrally disposed within said first annular flexible means and communicating with said port, a main pressure chamber disposed above said flexible means, a second annular flexible means, an opening in said second annular means disposed laterally thereof, a pressure release unit superposed over said second flexible means, said pressure release unit having a port therein adapted to communicate with said opening in said second annular flexible means, said second flexible means controlling flow between said pressure release port and said lateral opening, a diagonally disposed port adapted to communicate with said outlet passage and said port in said pressure release unit, said second flexible means being interposed between the pressure release unit and said pressure chamber, manually controlled pressure means associated with said second annular flexible means whereby upon pressure being exerted by said manually controlled pressure means upon said second annular flexible means the pressure in said main pressure chamber may be released through said pressure release unit and the line pressure will thereupon force the said first annular flexible means away from the said port connecting the said inlet and outlet passages and establish communication between said passages.

2. In a valve, a valve housing member having a pair of longitudinally aligned inlet and outlet passages, and a vertically extending valve portion, a port connecting said passages, an annular diaphragm overlying said port and passages, an aperture centrally disposed in said diaphragm, a spacer ring overlying said diaphragm, forming a main pressure control chamber, a second diaphragm superposed over the said spacer ring, said second diaphragm having an aperture disposed off center of said diaphragm, a cylindrical pressure release valve unit seated upon said second diaphragm, said unit being provided with an upper centrally recessed portion, an annular groove circumferentially extending about the outer face of said unit, said unit being vertically bored, a transverse bore disposed in said unit and communicating with said annular groove and the vertical bore, a plurality of grooves disposed in the lowermost face of said unit, a discharge port in the wall of said housing member on the outlet side communicating with the outlet passage and said annular groove, a third diaphragm superposed upon the pressure release unit, said third diaphragm being centrally apertured, a plunger disposed through said aperture of the third diaphragm and the vertical bore and adapted to contact said second diaphragm, a push button secured to said plunger and adapted to depress said plunger to depress the second said diaphragm wherefore pressure fluid in the pressure chamber escapes through the opening in said second diaphragm, by-passing the grooves in the lowermost face of the pressure release unit, through the vertical and transverse bores, the circumferential groove in the pressure release unit and the discharge port to the outlet passage, wherefore line pressure in the inlet passage overcomes the pressure in the pressure chamber above the first said diaphragm, and the said line pressure forces the first diaphragm away from the port permitting uninterrupted flow from the inlet to the outlet passage.

References Cited in the file of this patent

UNITED STATES PATENTS

| Number | Name | Date |
| --- | --- | --- |
| 1,176,535 | Fulton | Mar. 21, 1916 |
| 1,269,721 | Kuntny | June 18, 1918 |
| 1,663,701 | Hedges | Mar. 27, 1928 |
| 1,839,962 | Groeniger | Jan. 5, 1932 |
| 1,508,398 | Kelly | Sept. 16, 1934 |
| 2,230,644 | Horta | Feb. 4, 1941 |
| 2,235,304 | Toussaint | Mar. 18, 1941 |

FOREIGN PATENTS

| Number | Country | Date |
| --- | --- | --- |
| 264,980 | Germany | Oct. 2, 1913 |